United States Patent [19]

Takamatsu

[11] Patent Number: 5,137,258
[45] Date of Patent: Aug. 11, 1992

[54] BALL VALVE

[76] Inventor: Risuke Takamatsu, 10-go, 17-ban, Oimazatominami 6-chome, Higashinari-ku, Osaka, Japan

[21] Appl. No.: 584,936

[22] Filed: Sep. 19, 1990

[30] Foreign Application Priority Data

Sep. 20, 1989 [JP] Japan ................... 1-244132
May 30, 1990 [JP] Japan ................... 2-142350

[51] Int. Cl.$^5$ .............................................. F16K 5/20
[52] U.S. Cl. ..................................... 251/160; 251/188; 251/360
[58] Field of Search ............... 251/161, 163, 167, 162, 251/188, 360

[56] References Cited

U.S. PATENT DOCUMENTS

| | | | |
|---|---|---|---|
| 2,372,869 | 4/1945 | Wheatley, Sr. | 251/188 |
| 2,612,340 | 9/1952 | Laurent | 251/161 X |
| 3,193,244 | 7/1965 | Smith | 251/161 |
| 3,350,055 | 10/1967 | Campbell et al. | 251/188 X |
| 4,231,440 | 11/1980 | Erwin | 251/161 X |

FOREIGN PATENT DOCUMENTS

| | | | |
|---|---|---|---|
| 551241 | 5/1932 | Fed. Rep. of Germany | 251/162 |
| 282276 | 2/1931 | Italy | 251/163 |
| 480877 | 10/1975 | U.S.S.R. | 251/163 |

*Primary Examiner*—John C. Fox
*Attorney, Agent, or Firm*—Edwin E. Greigg; Ronald E. Greigg

[57] ABSTRACT

A ball valve having a spherical valve body which is rotarably mounted in a valve box and rotation of the spherical valve body controls a fluid to flow or stop. The spherical valve body provides sub-valve plates which may be pressed against valve seats so as to close a flow passage of the ball valve.

2 Claims, 7 Drawing Sheets

BALL VALVE

BACKGROUND OF THE INVENTION (1) Field of the Invention

The present invention relates to a ball valve which comprises a valve box having inlet and outlet openings, and a spherical valve body rotatably arranged in the valve box.

(2) Description of the Prior Art

Conventionally, such a ball valve mounts an O-ring on each of the valve seat surfaces which are formed with an end portion of each of the inlet and outlet openings which are positioned inside the valve box, and the spherical valve body is forcibly contacted with the O-rings so as to keep a closing state.

However, an ordinary O-ring is inferior in heat resistance, pressure tightness and chemical resistance and therefore such a ball valve is given a limitation with respect to places and conditions of fluids flowing therethrough.

It was proposed to directly contact the valve seat with the spherical valve body in the manner of metal to metal contact. Such a construction caused another problem for the spherical valve body tended to seize up in contact with the valve seat at the time of opening and closing of the flow openings with rotating operation of the spherical valve body.

In view of the fact, it might be proposed to carry out the contact between the spherical valve body and the valve seat lightly so as to prevent seizure of the spherical valve body. However, such a manner could not carry out closing and opening of the ball valve precisely and as the result caused leak of fluid.

SUMMARY OF THE INVENTION

An object of the present invention is to provide a ball valve which may prevent seizure of a spherical valve body and is superior in heat resistance, pressure tightness and chemical resistance.

To achieve the object, according to the present invention, a ball valve comprises a valve box having inlet and outlet openings, and a spherical valve body rotatably arranged in the valve box and having a flow passage arranged to communicate with the inlet and outlet openings so as to open and close the inlet and outlet openings of the valve box with rotation of the spherical valve body, the improvement comprising a sub-valve plate disposed respectively on the side of a close surface of the spherical valve body for closing the inlet and outlet openings to be in contact with and apart from the inlet and outlet openings and pressing means for pressing the backs of the sub-valve plates to close the inlet and outlet openings by the sub-valve plates.

Namely, by a pressure acting onto the backs of the sub-valve plates by using pressing means such as a cam mechanism or a hydraulic cylinder, the sub-valve plates are moved toward the inlet and outlet openings of the valve box so that the sub-valve plates may contact with the inlet and outlet openings surely and tightly and close them.

Where the pressure acting on the backs of the sub-valve plates is released, pressing contact of the sub-valve plates against the inlet and outlet openings is then released. Therefore, when the spherical valve body is rotated or tilted, the rotation of the spherical valve body may be smoothly carried out without strongly contacting the outer perihery of the spherical valve body and the sub-valve plates with the inlet and outlet openings of the valve box, and as the result, there is no possibility of seizure of the spherical valve body. Further, this ball valve is superior in heat resistance, pressure tightness and chemical resistance since metal to metal contact is used.

A second object of the present invention is to provide a ball valve which may prevent unexpected things in the flowing fluid to sandwich between the sub-valve plates and the valve seats of a valve box.

Namely, according to the construction of the above-mentioned ball valve, it becomes possible to smoothly carry out rotation of the spherical valve body since the sub-valve plates are moved apart from the valve seat of the inlet and outlet openings at the time of operation of the ball valve. However, since a small clearance is formed between the periphery of the spherical valve body and the valve seat and only the sub-valve plates are seated upon substantially the entirety of the valve seat, the spherical valve body is chattered at the time of rotating operation. Further, cut off of the fluid cannot be smoothly carried out at the time of closing the ball valve as a contact area between the valve seats and the sub-valve plates becomes large. Particularly, where unexpected things are included in the fluid, they are sometimes sandwiched between the valve seats and the sub-valve plates and cannot close the ball valve completely.

To solve the above-mentioned problem and achieve the second object, the ball valve according to the present invention further comprises a ring-like projecting valve seat disposed respectively on the inside wall of each of the end portions of the inlet and outlet openings, said inside wall being faced to the sub-valve body wherein a concave is respectively formed with peripheral portions of the spherical valve body perpendicular to the flow passage thereof to install the sub-valve plates therein to be movable in the directions close to and apart from the inlet and outlet openings and the peripheral portions of the spherical valve body adjacent the outer edges of the concaves are contacted with valve body support surfaces formed with the inner end of the inlet and outlet openings and the pressing means is positioned in the concaves behind the sub-valve plates.

Namely, the sub-valve plates may be contacted with and apart from the valve seats by moving same forward and rearward without sliding the sub-valve plates on the valve seats of the inlet and outlet openings. Therefore, wearing of the sub-valve plates becomes minimum in comparison with a conventional valve body which is sliding on the valve seat and it becomes possible to close the inlet and outlet openings surely and tightly. Further, it is possible to easily release the sub-valve plates without necessitating a strong operating force.

Further, since the valve seats are formed respectively in a shape of a ring-like projection, the sub-valve plates are contacted with the tip ends of the projections in a state of a line contact or an area contact of a thin width of a ring. Therefore, cut off of the fluid flowing through the ball valve may be carried out surely and sharply and as the result, even if unexpected things are included in the fluid, it becomes possible not to sandwich the unexpected things between the sub-valve plates and the valve seats so as to close the ball valve precisely and completely.

Further, the spherical valve body may be smoothly rotated while contacting with the valve body support surfaces of the inner ends of the inlet and outlet openings without chattering, and since the contacting portions of the spherical valve body do not function as a stopper for the fluid, it is possible to make its contact light so as to carry out rotation of the spherical valve body easily and smoothly.

A third object of the present invention is to provide a ball valve which one may easily change parts thereof and carry out its maintenance by simply removing the spherical valve body from the valve box.

Namely, according to the construction of the above-mentioned ball valve, it has such an advantage that the spherical valve body may be smoothly rotated since the sub-valve plates do not slide but move apart from the valve seats of the inlet and outlet openings at the time of valve operation. However, since the spherical surface of the spherical valve body is always fitted into the end surfaces of the inlet and outlet openings and sliding thereon, the spherical valve body cannot be taken out from the valve box when a lid of the valve box is detached and removed therefrom. Therefore, when changing parts or maintaining the spherical valve body and valve seats, flanges provided with the inlet and outlet openings of the valve box must be detached and separated from the conduit or pipe which is connected thereto and the whole ball valve must be removed from the conduit and thereafter the ball valve must be disassembled. Thus, it is very troublesome in disassembling the ball valve for its maintenance and assembling the ball valve and installing same with the conduit.

To solve the above-mentioned problem and achieve the third object, a ball valve according to the present invention further comprises a lid detachably secured to an opening formed with an upper portion of the valve box to insert the spherical valve body therein and take out same therefrom a valve stem connected to the spherical valve body to penetrates a central hole of the lid rotatably and is supported thereby, inner tubes each forming a valve seat with the end surfaces of the inlet and outlet openings for each of the peripheries of the sub-valve plates, said inner tubes being detachably secured to the valve box, outer tubes each forming the valve body support surfaces to fit the periphery of the spherical valve body adjacent the outer edges of the concaves for installing the sub-valve plates therein, said outer tubes being screwed to the periphery of the inner tubes to be movable in a direction of an axis thereof.

Accordingly, the valve box is opened by removing the lid therefrom and the outer tubes, each of which has the valve body support surface for the spherical valve body, are rotated through the upper opening of the valve box so as to move the outer tubes away from the spherical valve body and the sub-valve plates may be moved away from the valve seats by releasing a pressing force of the pressing means. Therefore, the spherical valve body may be easily taken out from the valve box.

After taking out the spherical valve body, the inner tubes and the outer tubes forming the inlet and outlet openings may be easily taken away in the valve box through the upper openings of the valve box. Therefore, the spherical valve body and the inner and outer tubes may be easily taken out from the valve box through the upper opening in such a state that the valve box is being connected to conduits or pipes to be communicated therewith. Thus, maintenance and change of parts for the spherical valve body, the sub-valve plates and the inner and outer tubes may be easily carried out.

Further, after the maintenance or change of parts was carried out, the ball valve may be easily assembled in such a manner that the inner and outer tubes are inserted into the inlet and outlet openings and then the spherical valve body is inserted into the box and thereafter the outer tubes are screwed so as to fit the valve body support surfaces of the outer tubes to the periphery of the spherical valve body. Then, the lid is attached to the valve box.

Other objects and advantages of the present invention will be apparent from the description of the embodiments with reference to the following drawings.

BRIEF DESCRIPTION OF THE DRAWINGS

The drawings show embodiments of a ball valve according to the present invention in which.

DETAILED DESCRIPTION OF THE EMBODIMENTS

Figure 1:
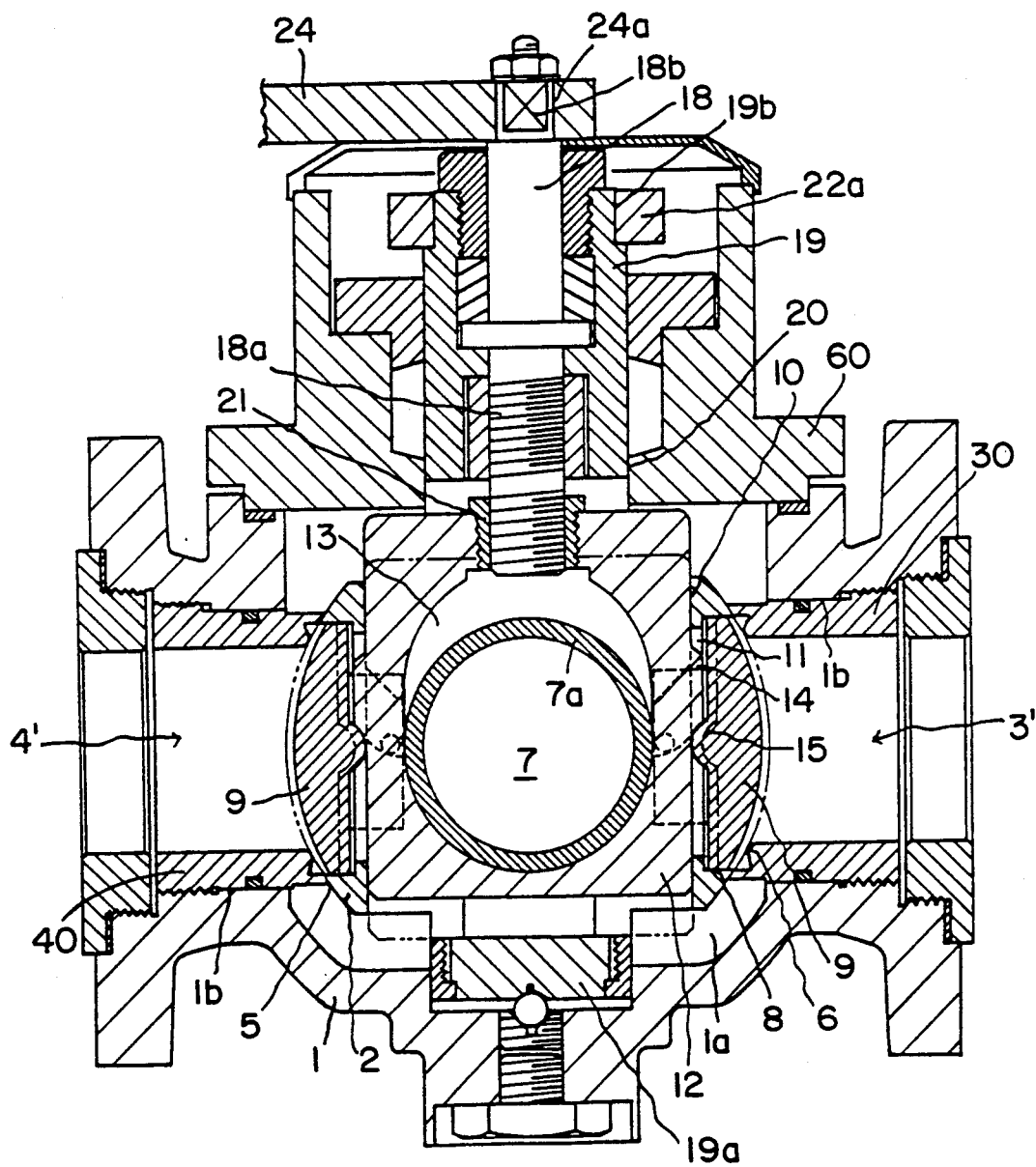
FIG. 1 is a sectional front view of the ball valve in the state that a flow passage is closed.
Figure 2:
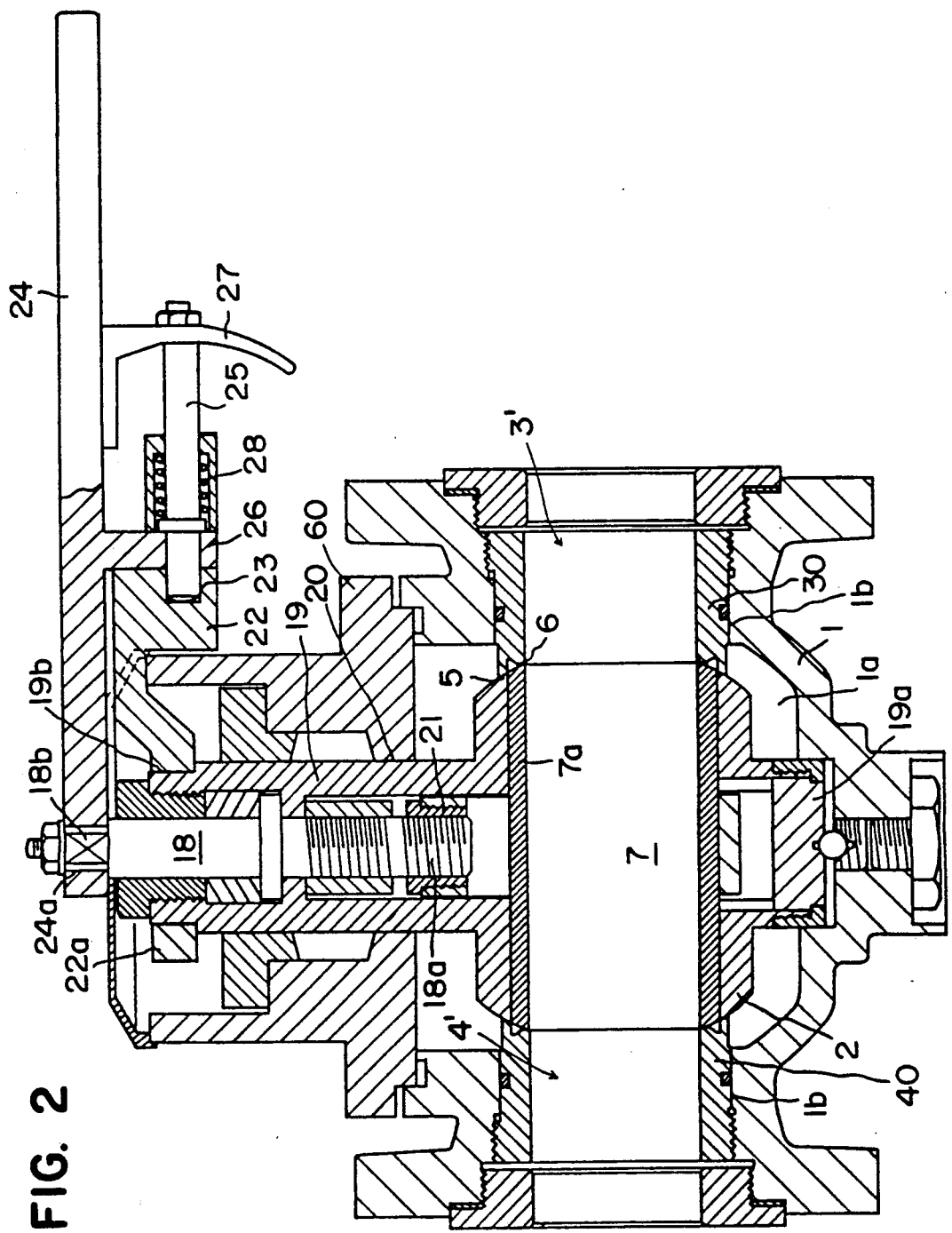
FIG. 2 is a sectional from view of the ball valve in the state that a flow passage is opened.
Figure 3:
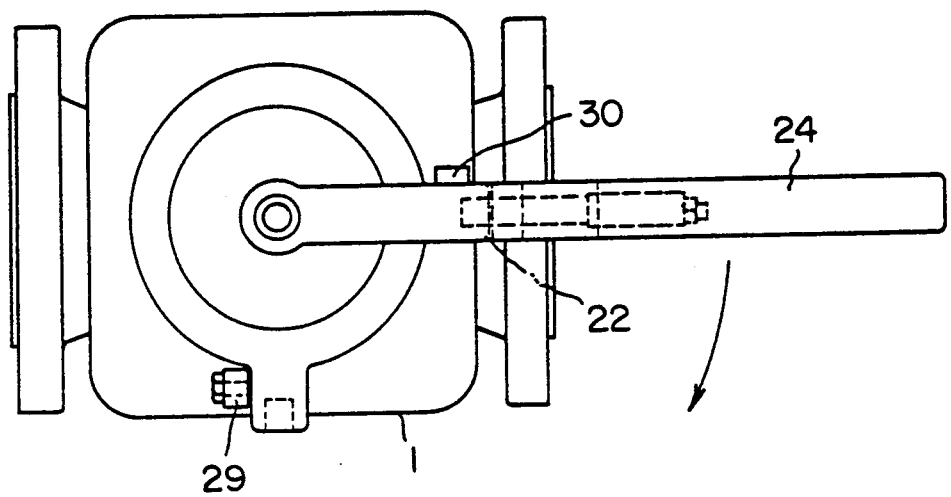
FIG. 3 is a brief plan view of the ball valve.

The first embodiment of the present invention will be described with reference to FIGS. 1 through 4. 1 is a valve box having a valve chamber $1a$ on the both sides of which penetrating openings $1b$ and $1c$ are provided to be communicated to each other on the same axis thereof.

A spherical valve body 2 is arranged at a center of the valve chamber $1a$ to be rotatable. Inlet and outlet tubes 30 and 40 made of metal are fitted into the penetrating openings $1a$ and $1b$ to screw therewith in order to form inlet and outlet openings 3' and 4'.

The inner end surfaces of the inlet and outlet openings 3' and 4' (i.e. the inner end surfaces of the inlet and outlet tubes 30 and 40), which are facing toward each other, are formed to be valve body support surfaces 5 which may gently contact with and slide on the upper and lower peripheral portions of the spherical valve body 2. The inner portions of the inlet and outlet tubes 30 and 40 are formed to be ring-like projecting valve seats 6 and their tip portions in section are formed in a shape of a semi-circle in section or to be a surface of very thin width.

The valve body support surfaces 5 of the inner end surfaces of the inlet and outlet openings 3' and 4' are formed to have the same curved surfaces as that of the spherical valve body 2, and the tip ends of the ring-like projecting valve seats 6 slightly retreat inwardly about 0.5 mm. from the curved surfaces.

A flow passage 7 penetrates the spherical valve body 2 in a radial direction thereof to be able to communicate with the inlet and outlet openings 3' and 4'. A circular concave 8 is formed respectively with the surfaces of the spherical valve body 2, which are perpendicular to the flow passage 7 and close the inlet and outlet openings 3' and 4'. The circular concaves 8 have a suitable depth and a diameter smaller than that of the spherical valve body 2 and greater than those of the ring-like projecting valve seats 6. A sub-valve plate 9 made of metal is fitted respectively into the circular concaves 8 so that it may be taken out therefrom. Each of the sub-valve plates 9 is formed in a shape of a circle and has a back which is formed to be flat and vertical and to have substantially the same outer curved surface as the spherical valve body 2.

10 indicates a guide opening which penetrates a central portion of the spherical valve body 2 in vertical directions. The guide opening 10 is formed in a shape of a rectangular in cross section and to be wide towards both of the concaves 8. A communicated space 11 is formed respectively between the both sides of the guide opening 10 and the concaves 8.

12 is a cam plate which is fitted into the guide opening 10 to be vertically slidable. An elliptic opening 13, which is long in vertical directions, is formed with a central portion of the cam plate 12. The elliptic opening 13 has a diameter greater than that of a tube 7a which is fitted into the flow passage 7. The flow passage 7 having the tube 7a also penetrates the elliptic opening 13 and the cam plate 12 is mounted movably in vertical directions with respect to the tube 7a.

Figure 4:
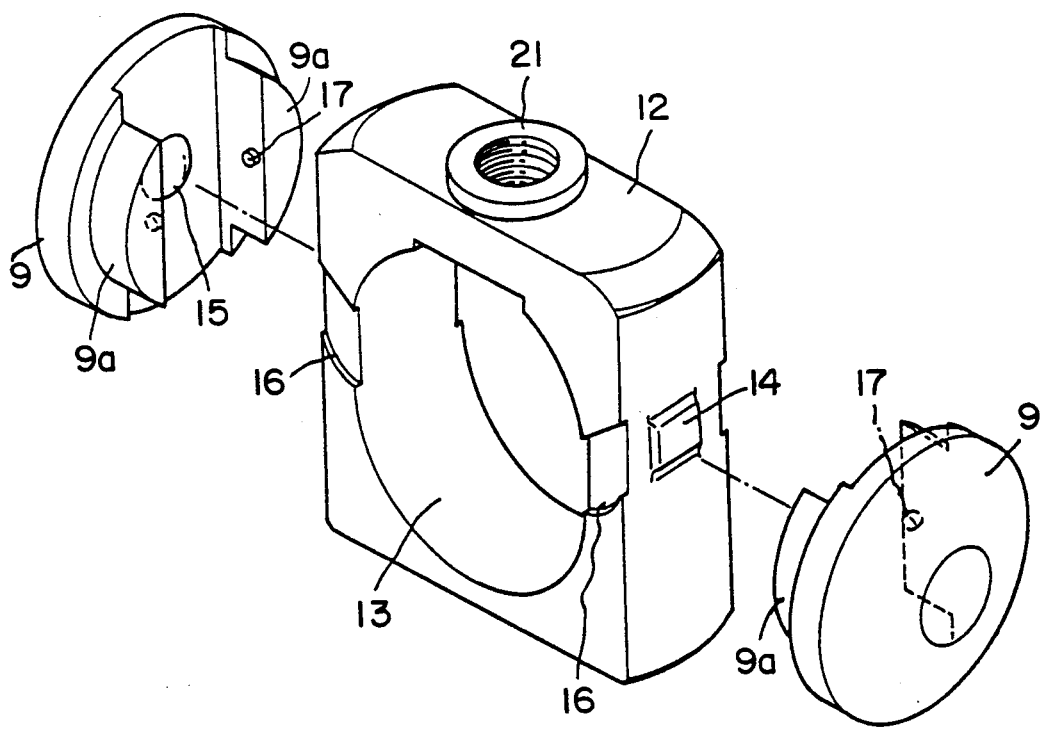
FIG. 4 is perspective views of a cam plate and sub-valve plates provided with a spherical valve body.
Figure 5:
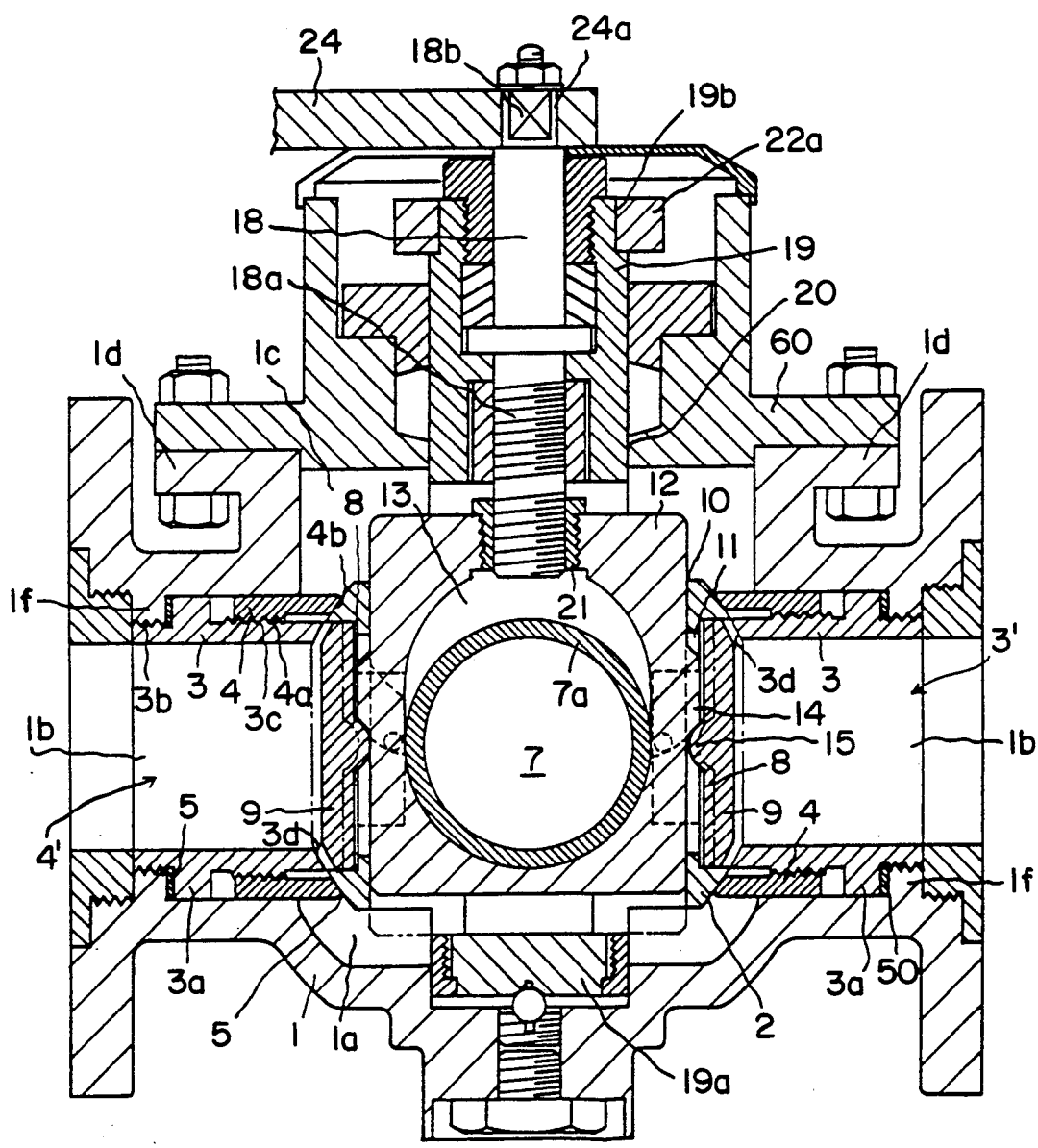
FIG. 5 is a sectional front view of the ball valve of a second embodiment in the state that a flow passage is closed.
Figure 6:
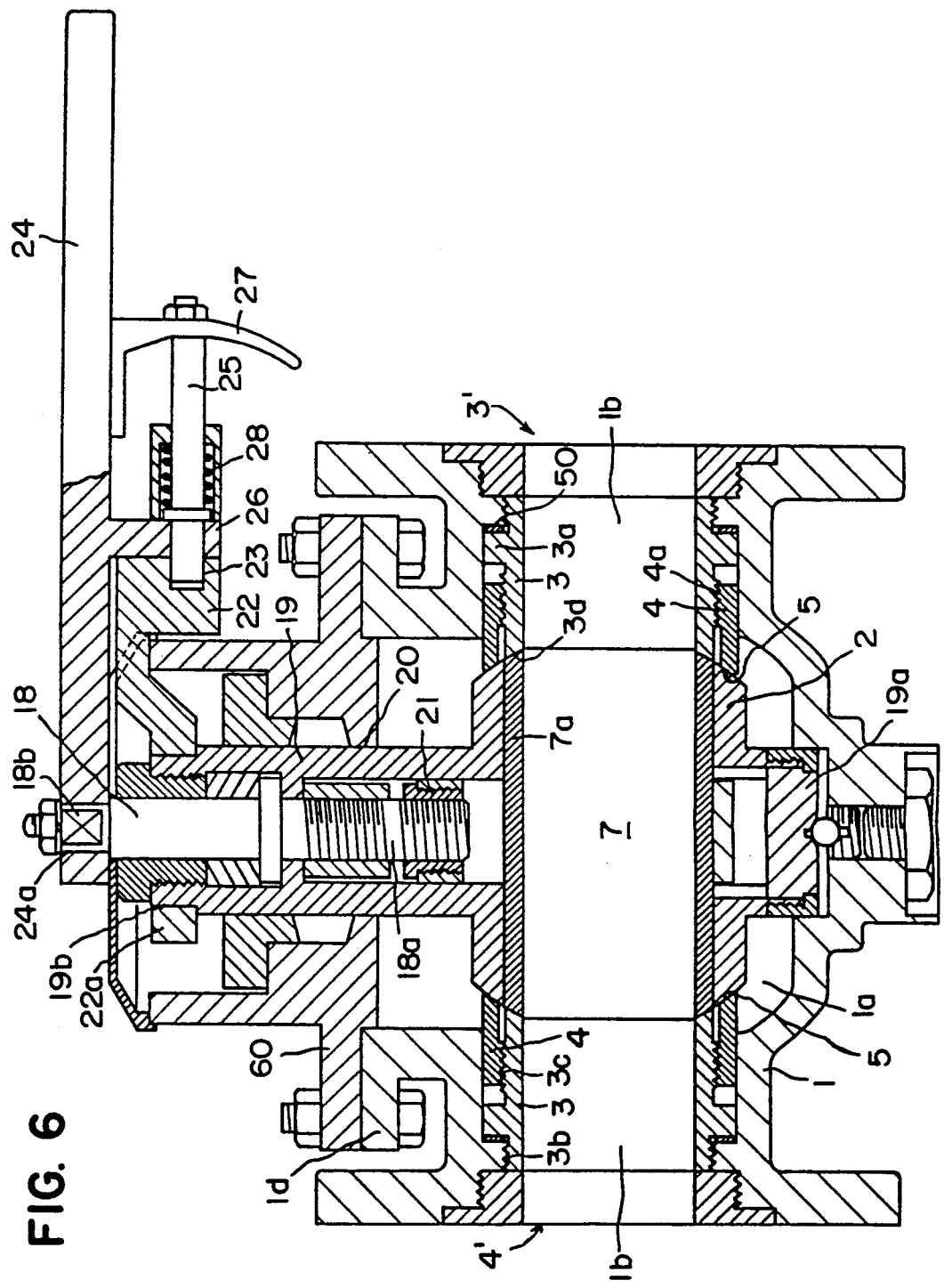
FIG. 6 is a sectional front view of the ball valve in a state that a flow passage is opened.
Figure 7:
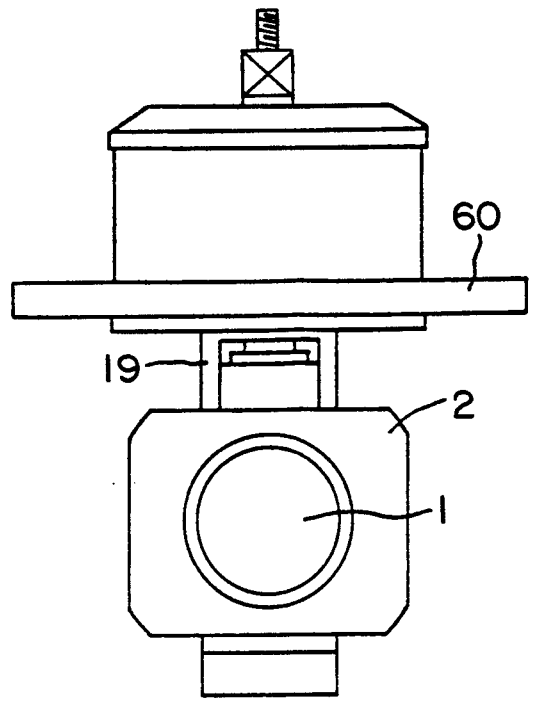
FIG. 7 is a front view of the ball valve wherein a spherical valve body is taken out.
Figure 7:
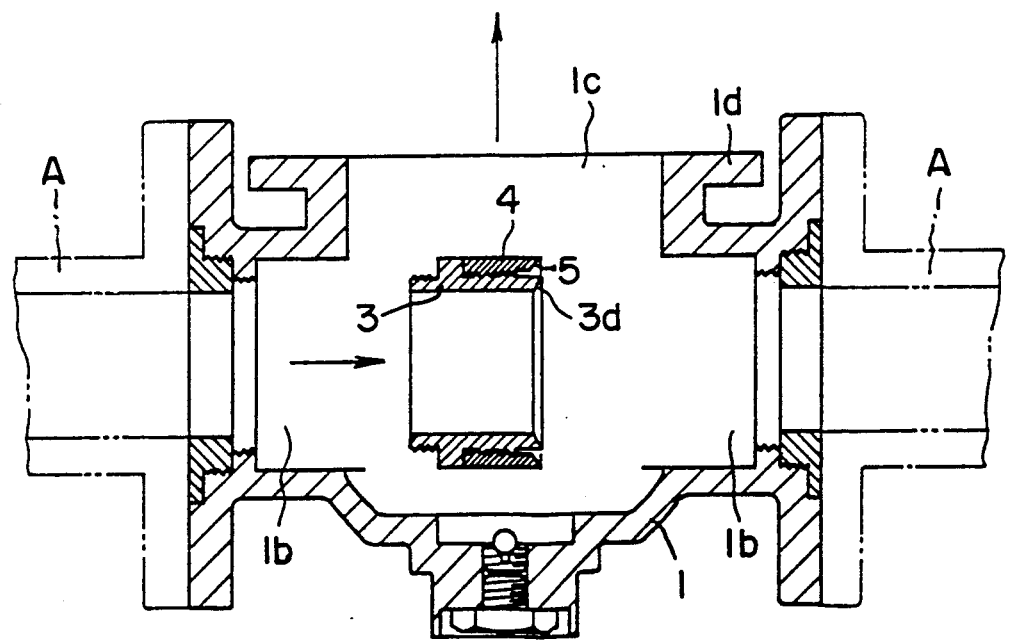

As shown in FIG. 4, a cam projection 14 having a predetermined height is formed integrally with central portions of the both sides of the cam plate 12, respectively. A projection 15 of semi-circle in section is formed integrally with a central portion of each of the backs of the sub-valve plates 9, respectively. In a closed position of the spherical valve body, the cam plate 12 is moved down so as to contact the cam projections 14 with the projections 15. This cam action may push the sub-valve plates 9 towards the inlet and outlet openings 3 and 4 to contact same with the ring-like valve seats 6 strongly so that the inlet and outlet openings 3' and 4' are closed tightly and maintained in the closed state.

A short arm 9a is formed respectively to project from the backs of the sub-valve plates 9 via the communicated spaces 11, and the short arms 9a face the central portions of the front and rear sides of the cam plate 12. An inclined groove 16 is formed respectively with the front and rear sides of the cam plate 12 in such a state that the inclined grooves are inclined upwardly from the both sides of the elliptic opening 13 to the outer edges of the cam plate 12. The short arms 9a are slidably engaged with the inclined grooves 16 by means of an engaging projection 17 which projects respectively from the central portions of the short arms 9a, and when the cam plate 12 is moved upwardly, the engaging projections 17 are guided by and moved along the grooves 16 so as to retract the sub-valve plates 9 into the concaves 8.

An upper valve stem 19 and a lower valve stem 19a are made to project from the upper and lower end surfaces of the spherical valve body 2 on the same vertical line. The upper valve stem 19 is formed to be a hollow shaft and the lower valve stem 19a is formed to be a short shaft. The upper valve stem 19 is supported rotatably in a penetrating opening 20 which penetrates a lid 60 vertically, and the upper valve stem 19 extends outwardly. The lower valve stem 19a is supported rotatably in a circular concave formed with a central portion of the bottom wall of the valve chamber 1a.

A threaded tube 21 is fixed to the upper central portion of the cam plate 12 in a state of a screw connection. The threaded tube 21 is screwed with a screw portion 18a which is provided with a lower portion of a cam plate operating shaft 18 which is rotatably supported in the hole of the upper valve shaft 19. The upper end portion of the cam plate operating shaft 18 is made to project from the upper valve stem 19. The cam plate operating shaft 18 is supported rotatably, but not to move vertically in the hole of the upper valve stem 19.

The outer surface of the upper valve stem 19, which projects from the upper surface of the valve box 1, is formed to be an engaging portion 19b in a shape of a rectangular. An engaging ring 22a is formed with a tip end of a first operating handle which has a rectangular hole, and the engaging portion 19b is detachably engaged with the engaging ring 22a. A pin hole 23 is opened with the base and vertical surface of the first operating handle 22 which extends laterally.

The numeral 24 indicates a second operating handle having a rectangular hole portion 24a at a tip thereof, and an angle shaft 18b formed with an upper portion of the cam plate operating shaft 18 is detachably engaged with, the rectangular hole portion 24a. A projection 26 is formed integrally with the under surface of the second operating handle 24 and a lateral pin 25 is slidably supported by the projection 26. The base portion of the lateral pin 25 is fixed to a lever 27, and the lever 27 is mounted on the under surface of the second operating handle 24 to be slidable in a longitudinal direction thereof. Further, a compression spring 28 is interposed between a suitable portion of the lateral pin 25 and the projection 26, so as to always urge the lateral pin 25 in a direction of insertion to the pin hole 23. In a normal state, the lateral pin 25 is engaged with the pin hole 23 so that the first and second handles 22 and 24 are rotated integrally.

29 and 30 are stopper projections which are provided on the upper surface of the valve box 1 in order to stop rotation of the spherical valve body 2 in a closed position and an open position. The stopper projections 29 and 30 stop the first operating handle 22 in contact with the side surface thereof.

The operation of the ball valve according to the first embodiment is as follows.

In the state that the first operating handle 22 is contacted with the stopper projection 29 for a closed position, namely the state that the spherical valve body 2 closes the inlet and outlet openings 3' and 4' to press the sub-valve plates 9 to the ring-like projecting valve seats 6 so as to close the inlet and outlet openings 3' and 4' , the second operating handle 24 is grasped and the lever 27 is withdrawn from this side against a tension force of the spring 28 so that the lateral pin 25 may be apart from the pin hole 23 of the first operating handle 22.

While keeping the pin 25 in an withdrawn state, the second operating handle 24 is rotated in a direction of open (Counter clockwise in FIG. 3) so that the cam plate operating shaft 18 may be rotated together with the second operating handle 24 without rotation of the first operating handle 22 due to release of the lateral pin 25 from the pin hole 23. As the result, the threaded portion 18a of the cam plate operating shaft 18 rotates and the cam plate 12, which has the threaded tube 21 engaging with the threaded portion 18a, is moved upwardly so as to upwardly move the cam projections 14 away from the projections 15 of the sub-valve plates 9. Then the engaging projections 17 are withdrawn by means of the inclined grooves 16 so as to retract the sub-valve plates 9 into the concaves 8 of the spherical valve body. Thus, the pressing contact of the sub-valve plates 9 with the ring-like projecting valve seats 6 may be released.

Thereafter, the second operating handle 24 is rotated upwardly of the first operating handle 22 and the lateral pin 25 is inserted into and engage with the pin hole 23. In the state, the second operating handle 24 is rotated in the same direction (Counter clockwise) and then the first operating handle 22 is rotated integrally therewith so that the second operating handle 24 may stop where it contacts with the stopper projection 30 for a closed position. In this state, the flow passage 7 of the spherical valve body 2 is communicating with the inlet and outlet openings 3' and 4' so as to allow the fluid to flow.

Next, where the inlet and outlet openings 3' and 4' are closed by the spherical valve body 2, the second operating handle 24 is rotated clock wise at 90 degrees in such a state that the lateral pin 25 is engaged with the pin hole 23. Then, the first operating handle 22 is rotated integrally with the second operating handle 24 so as to contact with the stopper projection 29 for a closed position. Thus, the sub-valve plates 9 of the spherical valve body 2 are facing the inlet and outlet openings 3' and 4'.

In this state, the lever 27 is withdrawn on this side against a tension force of the spring 28 so that the lateral pin 25 may be disengaged with and apart from the pin hole 23 of the first operating handle 22. While keeping the formed state, the second operating handle 24 is rotated clock wise so as to rotate the cam plate operating shaft 18 integrally in the same direction as the second operating handle 24. With the rotation of the threaded portion 18a, the cam plate 12, which has the threaded tube 21 engaged with the threaded portion 18a, moves down and the projections 15 ride on the cam projections 14 while the cam projections 14 are sliding on the cam projections 14. Therefore, the sub-valve plates having the projections 15 are made to project or be pushed out from the concaves 8 so as to contact with the ring-like projecting valve seats 6 and close the inlet and outlet openings 3' and 4'.

Further, as pressing means for pushing and pressing the sub-valve plates 9 of the spherical valve body 2, suitable mechanisms such as a piston mechanism or a link motion mechanism may be used other the that pressing means as described in the embodiment. Next, the second embodiment of the present invention will be described below with reference to FIGS. 5 through 8.

1 is a value box having a valve chamber 1a on the both sides of which penetrating openings 1b are provided to be communicated to each other on the same axis thereof. A spherical valve body 2 is arranged at a center of the valve chamber 1a to be rotatable. Inlet and outlet tubes 30 and 40 made of metal are fitted into the penetrating openings 1a and 1b to screw therewith in order to form inlet and outlet openings 3' and 4'.

An opening 1c is formed with the upper portion of the valve box 1 so that the spherical valve body 2 may be taken out from the opening 1c. Flanges 1d and 1e are formed with the outer ends of each of the opening 1c and the penetrating openings 1b, respectively.

A ring-like projection 3a is provided with a middle portion of the periphery of the inner tube 3 to be around same. An external thread portion 3b is formed with the periphery of an outer end of the inner tube 3.

The external thread portion 3b is screwed with an inner wall of a ring-like edge 1f which projects from the inner wall of the end portion of the penetrating opening 1b. A packing 50 made of copper is positioned between and sandwiched by the opposite faces of the edge 1f and the projection 3a. A further external thread 3c is formed with the periphery of the inner end of the inner tube 3.

On the other hand, the outer tube 4 is formed to have a thickness substantially equal to a clearance between the periphery of the inner end of the inner tube 3 and the inner surface of the penetrating opening 1b, and an internal thread 4a is formed with the inner wall of the inner tube 3 to be engaged with the external thread 3c of the inner tube 3.

Further, the inner ends of the inner tubes 3 and 3, which are facing to each other, are formed to be valve seat surfaces 3d which contact with the periphery of sub-valve plates 9 provided with the spherical valve body 2, which sub-valve plates 9 will be referred to hereinafter. On the other hand, the inner ends of the outer tubes 4 and 4, which are facing to each other, are formed to be support surfaces 5 which contact with the periphery of the spherical valve body located outwardly of the sub-valve plates 9.

A flow passage 7 penetrates the spherical valve body 2 in a radial direction thereof to be able to communicate with the inlet and outlet openings 3' and 4'. A circular concave 8 is formed respectively with the surfaces of the spherical valve body 2, which are perpendicular to the flow passage 7 and close the inlet and outlet openings 3' and 4'. The circular concaves 8 have a suitable depth and a diameter smaller than the inside diameter of the outer tube 4 and greater than the diameter of the valve seat surface 3d of the inner tube 3. A sub-valve plate 9 made of metal is fitted respectively into the circular concaves 8 so that it may be taken out therefrom. Each of the sub-valve plates 9 is formed in a shape of a circle and has a back which is formed to be flat and vertical and to have substantially the same curved surface as the spherical valve body 2.

60 indicates a lid which is detachably attached to the flange 1d of the opening 1c.

10 indicates a guide opening which penetrates a central portion of the spherical valve body 2 in vertical directions. The guide opening 10 is formed in a rectangular shape in cross section and to be wide towards both of the concaves 8. A communicated space 11 is formed respectively between the both sides of the guide opening 10 and the concaves 8.

12 is a cam plate which is fitted into the guide opening 10 to be vertically slidable. An elliptic opening 13, which is long in vertical directions is formed with a central portion of the cam plate 12. The elliptic opening 13 has a diameter greater than that of a tube 7a which is fitted into the flow passage 7. The flow passage 7 having the tube 7a also penetrates the elliptic opening 13 and the cam plate 12 is mounted movably in vertical directions with respect to the tube 7a.

Figure 8:
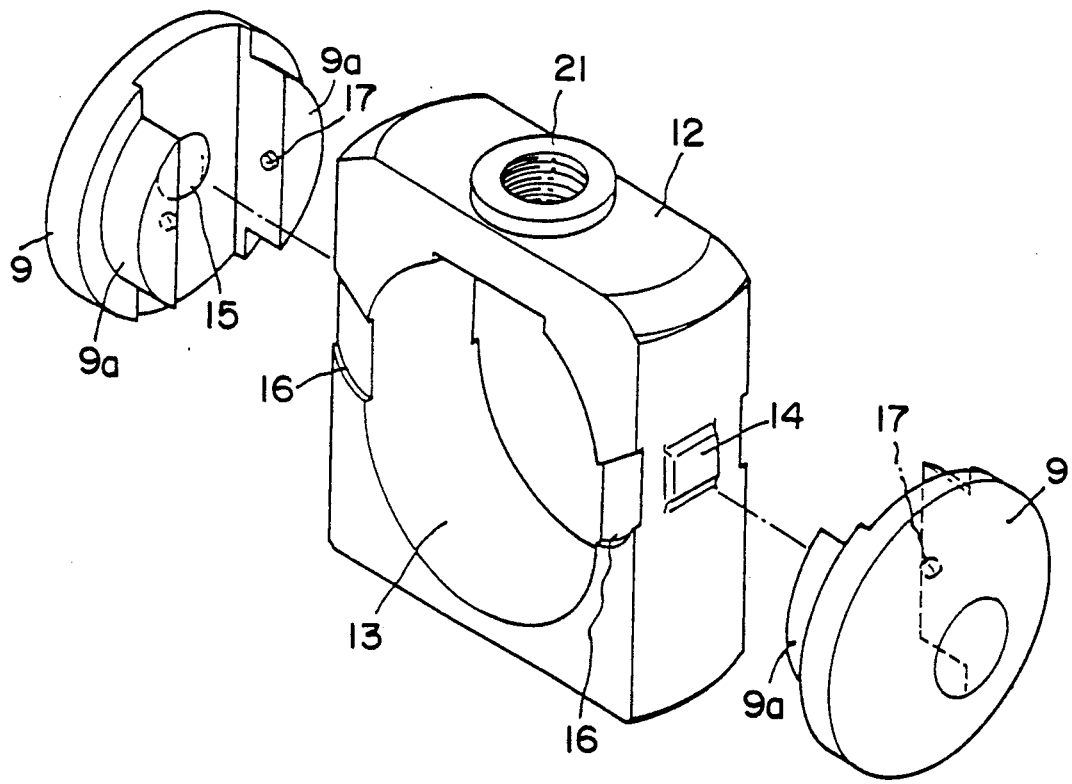
FIG. 8 is a perspective view of a cam plate and sub-valve plates provided with the spherical valve body.

As shown in FIG. 8, a cam projection 14 having a predetermined height is formed integrally with central portions of the both sides of the cam plate 12, respectively. A projection 15 of semi-circle in section is formed integrally with a central portion of each of the backs of the sub-valve plates 9, respectively. In a closed position of the spherical valve body, the cam plate 12 is moved down so as to contact the cam projections 14 with the projections 15. This cam action may push the sub-valve plates 9 towards the inlet and outlet openings 3 and 4 to contact same with the ring-like valve seats 6 strongly so that the inlet and outlet openings 3' and 4' are closed tightly and maintained in the closed state.

A short arm 9a is formed respectively to project from the backs of the sub-valve plates 9 via the communicated spaces 11, and the short arms 9a face the central portions of the front and rear sides of the cam plate 12. An inclined groove 16 is formed respectively with the front and rear sides of the cam plate 12 in such a state that the inclined grooves are inclined upwardly from the both sides of the elliptic opening 13 to the outer edges of the cam plate 12. The short arms 9a are slidably engaged with the inclined grooves 16 by means of an engaging projection 17 which projects respectively from the central portions of the short arms 9a, and when the cam plate 12 is moved upwardly, the engaging projections 17 are guided by and moved along the grooves 16 so as to retract the sub-valve plates 9 into the concaves 8.

An upper valve stem 19 and a lower valve stem 19a are made to project from the upper and lower end surfaces of the spherical valve body 2 on the same vertical line. The upper valve stem 19 is formed to be a hollow shaft and the lower valve stem 19a is formed to be a short shaft. The upper valve stem 19 is supported rotatably in a penetrating opening 20 which penetrates a lid 60 vertically, and the upper valve stem 19 extends outwardly. The lower valve stem 19a is supported rotatably in a circular concave formed with a central portion of the bottom wall of the valve chamber 1a.

A threaded tube 21 is fixed to the upper central portion of the cam plate 12 in a state of a screw connection. The threaded tube 21 is screwed with a screw portion 18a which is provided with a lower portion of a cam plate operating shaft 18 which is rotatably supported in the hole of the upper valve shaft 19. The upper end portion of the cam plate operating shaft 18 is made to project from the upper valve stem 19. The cam plate operating shaft 18 is supported rotatably, but not to move vertically in the hole of the upper valve stem 19.

The outer surface of the upper valve stem 19, which projects from the upper surface of the valve box 1, is formed to be an engaging portion 19b in a rectangular shape. An engaging ring 22a is formed with a tip end of a first operating handle which has a rectangular hole, and the engaging portion 19b is detachably engated with the engaging ring 22a. A pin hole 23 is opened with the base and vertical surface of the first operating handle 22 which extends laterally.

The numeral 24 indicates a second operating handle having a rectangular hole portion 24a at a tip thereof, and an angle shaft 18b formed with an upper portion of the cam plate operating shaft 18 is detachably engaged with the rectangular hole portion 24a. A projection 26 is formed integrally with the under surface of the second operating handle 24 and a lateral pin 25 is slidably supported by the projection 26. The base portion of the lateral pin 25 is fixed to a lever 27, and the lever 27 is mounted on the under surface of the second operating handle 24 to be slidable in a longitudinal direction thereof. Further, a compression spring 28 is interposed between a suitable portion of the lateral pin 25 and the projection 26, so as to always urge the lateral pin 25 in a direction of insertion to the pin hole 23. In a normal state, the lateral pin 25 is engaged with the pin hole 23 so that the first and second handles 22 and 24 are rotated integrally.

Stopper projections are provided on the upper surface of the valve box 1 in order to stop rotation of the spherical valve body 2 in a closed position and an open position, but they are not shown in the drawings.

The above mentioned ball valve is used in such a state that the flange 1e is connected to a flange a of a pipe A, respectively by means of bolts.

The operation of the ball valve according to the second embodiment is as follows.

In the state that the first operating handle 22 is positioned in a closed position of the ball valve, namely the state that the spherical valve body 2 closes the inlet and outlet openings 3' and 4' to press the sub-valve plates 9 to the valve seat surfaces 3d of the inner tubes 3 so as to close the inlet and outlet openings 3' and 4', the second operating handle 24 is grasped and the lever 27 is withdrawn against a tension force of the spring 28 so that the lateral pin 25 may be apart from the pin hole 23 of the first operating handle 22.

While keeping this state, the second operating handle 24 is rotated in a direction of open so that the cam plate operating shaft 18 may be rotated together with the second operating handle 24 without rotation of the first operating handle 22 due to release of the lateral pin 25 from the pin hole 23. As the result, the threaded portion 18a of the cam plate operating shaft 18 rotates and the cam plate 12, which has the threaded tube 21 engaging with the threaded portion 18a, is moved upwardly so as to upwardly move the cam projections 14 away, from the projections 15 of the sub-valve plates 9.

Then the engaging projections 17 are withdrawn by means of the inclined grooves 16 so as to retract the sub-valve plates 9 into the concaves 8 of the spherical valve body. Thus, the pressing contact of the sub-valve plates 9 with the valve seat surfaces 3d may be released.

Thereafter, the second operating handle 24 is rotated upwardly of the first operating handle 22 and the lateral pin 25 is inserted into and engaged with the pin hole 23. In this state, the second operating handle 24 is rotated in the same direction and then the first operating handle 22 is rotated integrally therewith so that the second operating handle 24 may stop where it contacts with the stopper projection 30 for a closed position. In this state, the flow passage 7 of the spherical valve body 2 is communicated with the inlet and outlet openings 3' and 4' so as to allow the fluid to flow.

Next, where the inlet and outlet openings 3' and 4' are closed by the spherical valve body 2, the second operating handle 24 is rotated at 90 degrees in such a state that the lateral pin 25 is engaged with the pin hole 23. Then, the first operating handle 22 is rotated integrally with the second operating handle 24 so as to contact with the stopper projection 29 for a closed position. Thus, the sub-valve plates 9 of the spherical valve body 2 are facing the inlet and outlet openings 3' and 4'.

In this state, the lever 27 is withdrawn against a tension force of the spring 28 so that the lateral pin 25 may be disengaged from the pin hole 23 of the first operating handle 22. While keeping this state, the second operating handle 24 is rotated clock wise so as to rotate the cam plate operating shaft 18 integrally in the same direction as the second operating handle 24. With the rotation of the threaded portion 18a, the cam plate 12, which has the threaded tube 21 engaged with the screwed portion 18a, moves down and the projections 15 ride on the cam projections 14 while the cam projections 14 are sliding on the cam projections 14. Therefore, the sub-valve plates having the projections 15 are made to project or pushed out from the concaves 8 so as to contact with the valve seat surfaces 3d of the inner tubes 3 and close the inlet and outlet openings 3' and 4'.

Further, as pressing means for pushing and pressing the sub-valve plates 9 of the spherical valve body 2, suitable mechanisms such as a piston mechanism or a link motion mechanism may be used other than that pressing means, as is described in the first embodiment.

Next, where maintenance or change of parts of the ball valve is required in such a state that the pipes A are connected to the ball valve, the first and second operating handles 22 and 24 are removed and then the lid 60 of the valve box 1 is also removed so as to make the opening portion 1c of the valve box 1 open. As the result, a clearance appears between the valve stem 19 of the spherical valve body 2 and the opening portion 1c to be communicated with the valve chamber 1a.

Then, a suitable rotating jig such as a supana is inserted into the valve box 1 through the clearance of the opening portion 1c so as to rotate the inner ends of the outer tubes 4, which project from the penetrating opening 1b into the valve chamber 1a, and screw the outer tubes 4 towards the side of the projections 3a which project from the periphery of the inner tubes 3. As the result, the valve body support surfaces 5 of the outer tubes 4 becomes apart from the surface of the spherical valve body 2.

On the other hand, the cam plate operating shaft 18 is rotated by means of the second operating handle 24 so as to release the pressing force to the sub-valve plates 9. Then, the sub-valve plates 9 are retracted into the circular concaves 8 of the spherical valve body 2 and apart from the valve seat surfaces 3d of the inner tubes 3. This operation may be carried our prior to removing the lid 60.

Thus, the contact and engagement of the spherical valve body 2 with the inner and outer tubes 3 and 4 is released and as the result the spherical valve body 2 may be taken out from the valve chamber 1a by grasping same without interference of the inner and outer tubes 3 and 4.

After removing the spherical valve body 2 from the valve box 1, the inner tubes 3 is rotated by means of a suitable rotating jig such as a supana so that the inner tubes 3 are propelled into the valve chamber 1a in screw engagement with the threaded portion of the projecting edge portion 1f of the penetrating openings 1b of the valve box 1. Then, the inner tubes 3 may be taken out through the penetrating openings 1b together with the outer tubes 4.

Thus, the spherical valve body 2 having the sub-valve plates 9, the inner and outer tubes 3 and 4 forming the inlet and outlet openings 3' and 4', may be separated from the valve box 1 which is connected to the pipes A. Therefore, these elements my be easily changed or maintained where it is required and thereafter the inner and outer tubes 3 and 4 may be inserted into the penetrating openings 1b and the outer tubes 4 are screwed so as to contact the support surfaces thereof with the periphery of the spherical valve body 2, and then the lid 60 is attached to the valve box 1 to complete its assembly.

What is claimed is:

1. A ball valve comprising a valve housing including a valve box having inlet and outlet openings, a spherical valve body rotatably arranged in the valve box, said valve body having a flow passage therethrough that communicates with the inlet and outlet openings so as to permit fluid to flow from said inlet opening to said outlet opening of the valve box and with rotation of the spherical valve body through a 90° rotation, said valve body prevents flow of fluid from said inlet opening to said outlet opening, said spherical valve body including a sub-valve plate disposed respectively on opposite sides thereof on a first axis perpendicular to a second axis through said flow passage in said spherical valve body for seating against said inlet opening and said outlet opening thereby closing the inlet and outlet openings, each of said sub-valve plates including a flat back side perpendicular to said first axis and a front side having a circular shape which seats against said inlet opening and said outlet opening, and pressing means for pressing the backs of the sub-valve plates to close the inlet and outlet openings by the sub-valve plates, a ring-like projecting valve seat disposed respectively on an inside wall of an end portion of each of the inlet and outlet openings, said inside wall being faced toward a front side of the sub-valve plates, a concave cutout is respectively formed within the spherical valve body perpendicular to said first axis for installing the sub-valve plates therein to be movable in a direction toward said valve seat to close the inlet and outlet openings, and the pressing means is positioned in the concave cutouts behind the sub-valve plates, a lid detachably secured to an opening formed with an upper portion of the valve box for inserting and removing the spherical valve body, a rotatable valve stem connected to the spherical valve body, said valve stem penetrates a central hole of the lid and is supported thereby, said inlet opening and said outlet openings are formed by inner tubes (3) each having end surfaces that form said valve seats for each of the peripheries of the sub-valve plates, said inner tubes being detachably secured to the valve box, and outer tubes (4) each forming valve body support surfaces that fit a periphery of the spherical valve body adjacent outer edges of the concave cutouts in which the sub-valve plates are installed, said outer tubes being threaded to the periphery of the inner tubes for movement in a direction of an axis thereof.

2. A ball valve as claimed in claim 1, wherein said pressing means comprises a cam plate.

* * * * *